United States Patent
Howell et al.

(10) Patent No.: US 12,462,227 B2
(45) Date of Patent: Nov. 4, 2025

(54) DISPENSING SYSTEM

(71) Applicant: Kimberly-Clark Worldwide, Inc., Neenah, WI (US)

(72) Inventors: Reilly Howell, Atlanta, GA (US); Stephen Becker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 165 days.

(21) Appl. No.: 17/800,814

(22) PCT Filed: Feb. 21, 2020

(86) PCT No.: PCT/US2020/019310
§ 371 (c)(1),
(2) Date: Aug. 18, 2022

(87) PCT Pub. No.: WO2021/167623
PCT Pub. Date: Aug. 26, 2021

(65) Prior Publication Data
US 2023/0085321 A1    Mar. 16, 2023

(51) Int. Cl.
*G06Q 10/20* (2023.01)
*A47K 10/32* (2006.01)

(52) U.S. Cl.
CPC .............. *G06Q 10/20* (2013.01); *A47K 10/32* (2013.01); *A47K 2010/3226* (2013.01)

(58) Field of Classification Search
None
See application file for complete search history.

(56) References Cited

U.S. PATENT DOCUMENTS

| | | | |
|---|---|---|---|
| 6,360,181 B1 | 3/2002 | Gemmell et al. | |
| 7,107,231 B1 * | 9/2006 | Hall | G06Q 30/0273 705/14.38 |

(Continued)

FOREIGN PATENT DOCUMENTS

| | | |
|---|---|---|
| CA | 2552123 A1 | 7/2005 |
| WO | 2015109073 A1 | 7/2015 |

(Continued)

OTHER PUBLICATIONS

Jacobsen, Rune Hylsberg, et al., "A Modular Platform for Wireless Body Area Network Research and Real-life Experiments", International Journal on Advances in Network and Services, Year 2011, pp. 257-277, vol. 4 No. 3&4, http://citeseerx.ist.psu.edu/viewdoc/download?doi=10.1.1.231.5582&rep=rep1&type=pdf#page=22.

*Primary Examiner* — Michael J Sittner
(74) *Attorney, Agent, or Firm* — Dority & Mannning, P.A.

(57) ABSTRACT

Methods, systems and apparatus for operating a dispenser system including receiving product usage information and battery status from each of a plurality of dispensers, determining expected product depletion dates for each of the plurality of dispensers based on the respective product usage information; determining expected battery depletion dates for each of the plurality of dispensers based on the respective battery status; determining respective dispenser tasks for one or more of the plurality of dispensers that specify tasks a dispenser is responsible to perform over a given time period to cause, for each of one or more of the plurality of dispensers, the respective expected product depletion date and expected battery depletion date to be within a threshold range of one another, and communicating the respective dispenser tasks to the one or more of the plurality of dispensers.

16 Claims, 6 Drawing Sheets

(56) References Cited

U.S. PATENT DOCUMENTS

| | | | |
|---|---|---|---|
| 7,774,096 B2 * | 8/2010 | Goerg | A47K 10/3662 |
| | | | 700/244 |
| 7,783,380 B2 | 8/2010 | York et al. | |
| 7,855,651 B2 | 12/2010 | LeBlond et al. | |
| 8,264,343 B2 | 9/2012 | Snodgrass | |
| 9,940,819 B2 | 4/2018 | Ferniany | |
| 2004/0134924 A1 | 7/2004 | Hansen et al. | |
| 2012/0245729 A1 | 9/2012 | Wegelin et al. | |
| 2014/0074285 A1 | 3/2014 | Wegelin et al. | |
| 2018/0024202 A1 | 1/2018 | Erickson et al. | |
| 2018/0306869 A1 | 10/2018 | Erickson et al. | |
| 2018/0354777 A1 | 12/2018 | Slater et al. | |
| 2018/0368626 A1 * | 12/2018 | Williams, Jr. | A47K 10/3687 |
| 2018/0368627 A1 | 12/2018 | Ghazi et al. | |
| 2019/0014954 A1 | 1/2019 | Yang et al. | |

FOREIGN PATENT DOCUMENTS

| | | | | |
|---|---|---|---|---|
| WO | WO-2017188973 A1 * | 11/2017 | | G06Q 10/20 |
| WO | 2019108996 A1 | 6/2019 | | |

\* cited by examiner

DISPENSING SYSTEM

This disclosure relates to managing servicing dispensers through coordinating consumable product and battery usage in dispensers.

BACKGROUND

Systems dispensing consumable products are ubiquitous in many environments today. For example, hand towel dispensers are commonplace in many private, semi-private and public washrooms, work areas, food processing stations and kitchens. Monitoring and refilling such dispensers can be a time consuming and laborious endeavor requiring, in some scenarios, that an attendant or building maintenance team member routinely check each dispenser and refill or service as needed. This process inevitably results in checking a dispenser and determining that no refill is required, resulting in an unnecessary visit to the dispenser, which leads to building management inefficiencies and additional costs.

As such, some dispensers include functionality to wirelessly report to a (remote) central management device when they are low on consumable product such that those dispensers only need to be serviced at such times, thereby avoiding unnecessary service visits. However, transmitting those reports can prematurely drain the battery, which, itself, can cause additional service visits separate and apart from those visits to refill the dispenser with more consumable product.

SUMMARY

In general, the subject matter of this specification relates to managing servicing dispensers through coordinating consumable product and battery usage in dispensers.

In general, one aspect of the subject matter described in this specification can be implemented in a dispensing system comprising a plurality of dispensers, each configured to dispense one of soap, sanitizer, paper towels or air freshener and each is configured to report product usage information and battery status, wherein the battery status of a dispenser represents battery energy available to the dispenser to complete dispenser tasks; and a data processing system configured to receive the product usage information and battery status for each of the plurality of dispensers, determine expected product depletion dates for each of the plurality of dispensers based on the respective product usage information, and determine expected battery depletion dates for each of the plurality of dispensers based on the respective battery status, determine respective dispenser tasks for one or more of the plurality of dispensers that specify tasks a dispenser is responsible to perform over a given time period to cause, for each of one or more of the plurality of dispensers, the respective expected product depletion date and expected battery depletion date to be within a threshold range of one another, and communicate the respective dispenser tasks to the one or more of the plurality of dispensers. Other embodiments of this aspect include corresponding methods and apparatus.

Yet another aspect of the subject matter described in this specification can be implemented in methods that include receiving product usage information and battery status for each of a plurality of dispensers; determining expected product depletion dates for each of the plurality of dispensers based on the respective product usage information; determining expected battery depletion dates for each of the plurality of dispensers based on the respective battery status; determining respective dispenser tasks for one or more of the plurality of dispensers that specify tasks a dispenser is responsible to perform over a given time period to cause, for each of one or more of the plurality of dispensers, the respective expected product depletion date and expected battery depletion date to be within a threshold range of one another, and communicating the respective dispenser tasks to the one or more of the plurality of dispensers. Other embodiments of this aspect include corresponding systems and apparatus.

A further aspect of the subject matter described in this specification can be implemented in methods that include communicating product usage information and battery status to a data processing system, wherein the data processing system determines an expected product depletion date based on the product usage information and determines an expected battery depletion date based on the battery status; and receiving, from the data processing system, a dispenser task that specifies a task to perform over a given time period to cause the expected product depletion date and expected battery depletion date to be within a threshold range of one another. Other embodiments of this aspect include corresponding systems and apparatus.

Particular embodiments of the subject matter described in this specification can be implemented so as to realize one or more of the following advantages. For example, instead of having to service dispensers based on individually reacting to when the dispenser needs to be refilled with product, e.g., paper towels, or have its batteries replaced, the system can analyze the state of various dispensers, including product level and battery level, and determine which of the dispensers should act as the communication hub to gather reporting data from all the other dispensers and send that aggregated data to a central management device (which is a battery intensive task) to balance expected battery life with expected product refill dates to align replacing batteries with refilling a dispenser with consumable product. This acts to minimize the number of service visits required for each or a group of dispensers, which is desirable as service visits are labor intensive and costly. And if these service visits are not performed timely the result can be dissatisfied users experiencing dispensers with no product to dispense or no or too little battery power to operate properly.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
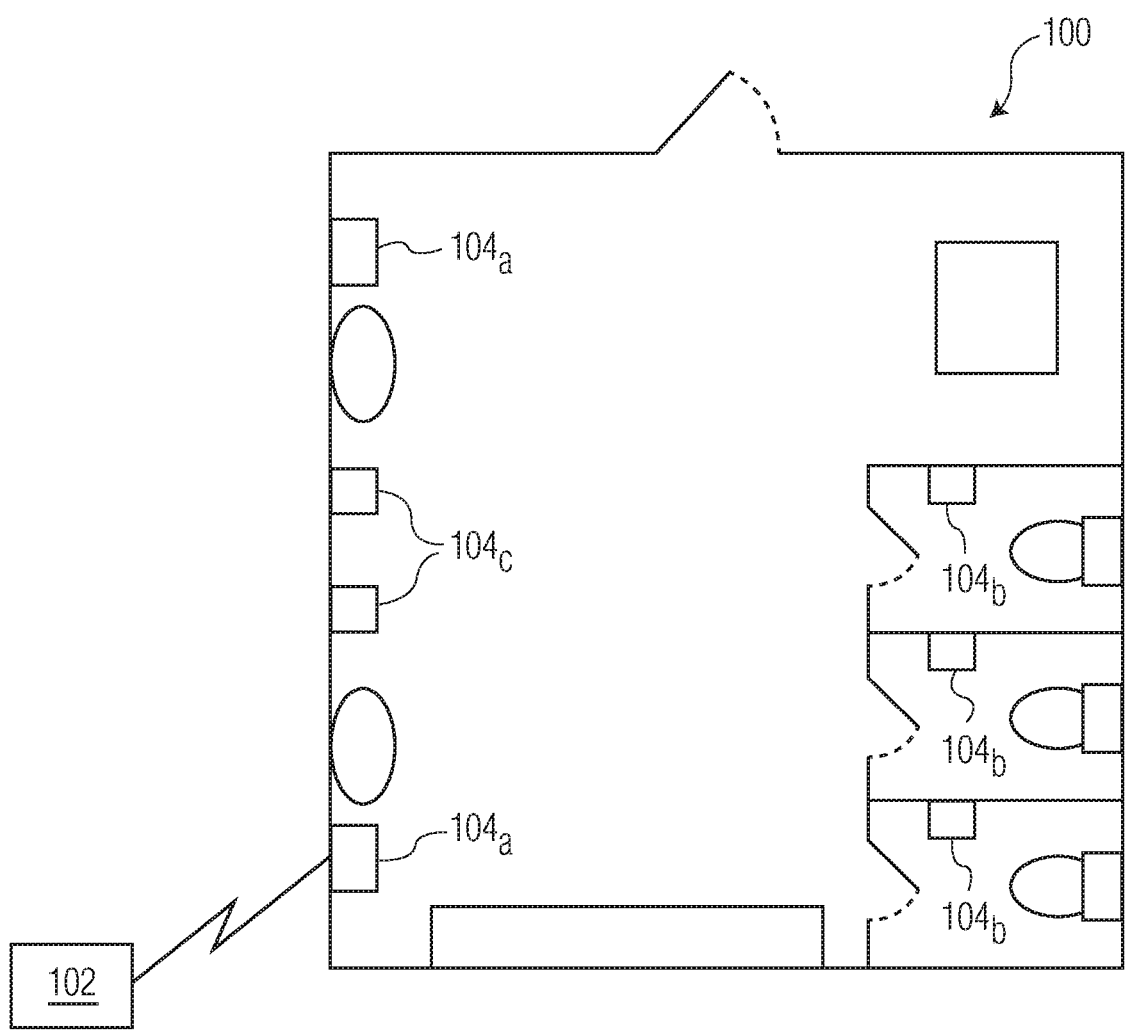
FIG. 1 is a block diagram of an example environment in which a dispensing system can be implemented.

The present disclosure generally relates to managing the servicing of dispensers (e.g., hygienic dispensers). Many washrooms today include so-called smart dispensers. These smart dispensers are generally characterized by the ability to monitor and record data concerning their operation and transmit that data to each other and/or a remote, central system for analysis. This analysis may include, for example, determining a dispenser is low on paper and sending an alert to a service attendant to refill the dispenser with more product and/or synthesizing the dispenser data to present that data in a useful form to an administrator in charge of the building's facilities. Attendant with these increased capabilities, e.g., data collection and transmission, come increasing demands on dispenser batteries, resulting in more frequent service visits to replace low or dead batteries. This adds to the service scheduling complexities of a building that often includes multiple floors with multiple washrooms on each floor and numerous dispensers in each washroom.

Often individual dispensers see different levels of use. For example, a paper towel dispenser near the sink may see higher use than one further away and therefore runout of product more frequently than the one further away. Also, different dispensers may require different power levels to transmit their data to the central system, based on the dispenser's positioning in the washroom and obstacles in the transmission path, and thus dispensers may use batteries at different rates. Further, one dispenser may be able to communicate with other dispensers in the same washroom more efficiently, e.g., with respect to power consumption, given its relative location to the other dispensers. As such, servicing these dispensers is hard to predict and often requires multiple service visits, e.g., one to refill the consumable product and another to replace batteries, which is highly inefficient.

The dispenser system described herein provides the ability to coordinate consumable product refills and battery replacement (or recharge) requirements in a given dispenser such that they can be serviced in the same visit while maximizing the useful life of each, e.g., replacing the consumable product only when it's near or about to be fully depleted and the battery when its low or about to die. This coordination can occur not only for a given dispenser but also across a set of dispensers depending on the particular implementation of the dispensing system.

More specifically, the dispenser system repeatedly analyzes consumable product levels and battery states of a set of dispensers and selects a given dispenser to act as a master transmitting dispenser. In this role the master transmitting dispenser functions to receive dispenser data from the other dispensers in the set and then send the dispenser data for the entire set of dispensers to the central system.

This backhaul communication transmission from the master transmitting dispenser to the central system is power intensive, whereas the short transmissions between dispensers to collect data at the master transmitting dispenser have much lower power requirements. In this way the system can prolong the battery life of dispensers who are not acting as the master transmitting dispenser. The system can also change which dispenser is acting as the master transmitting dispenser to allow the system to balance battery life of the dispensers to better match their respective predicted refill requirement dates/ranges, which can be based on historical norms. To note, in some implementations, there will be many consumable product refills performed before a battery replacement or recharge may be needed. The operation of such a dispensing system is described in more detail below with reference to FIG. 1.

FIG. 1 is a block diagram of an example environment in which a dispensing system 100 can be implemented. In some implementations, the dispensing system 100 includes one or more dispensers 104 and a data processing system 102. The environment can include, for example, a semi-private or public washroom or break room or another space in which the dispensers 104 are located. The dispensers 104 can include, for example, hand towel dispensers 104a, bath tissue dispensers 104b, hand soap (or other cleansing) dispensers 104c, air care and facial care (tissue) dispensers (not pictured), surface cleaning, sanitizing or disinfecting dispensers (not pictured) including for toilets or urinals, and/or the like. These types of dispensers 104 generally dispense consumable hygiene products, which are products intended to promote good hygiene or sanitation such as by cleaning or sanitizing a user and/or a surface. A dispenser 104, more generally, is a device that holds consumable product and dispenses the consumable product in response to a stimulus, e.g., an environmental stimulus (e.g., light/darkness), at pre-determined (e.g., programmatically set) intervals or by manual user actuation such as pulling an exposed portion of the consumable product or via a pumping-type process (e.g., for some manual soap dispensers).

Figure 2:
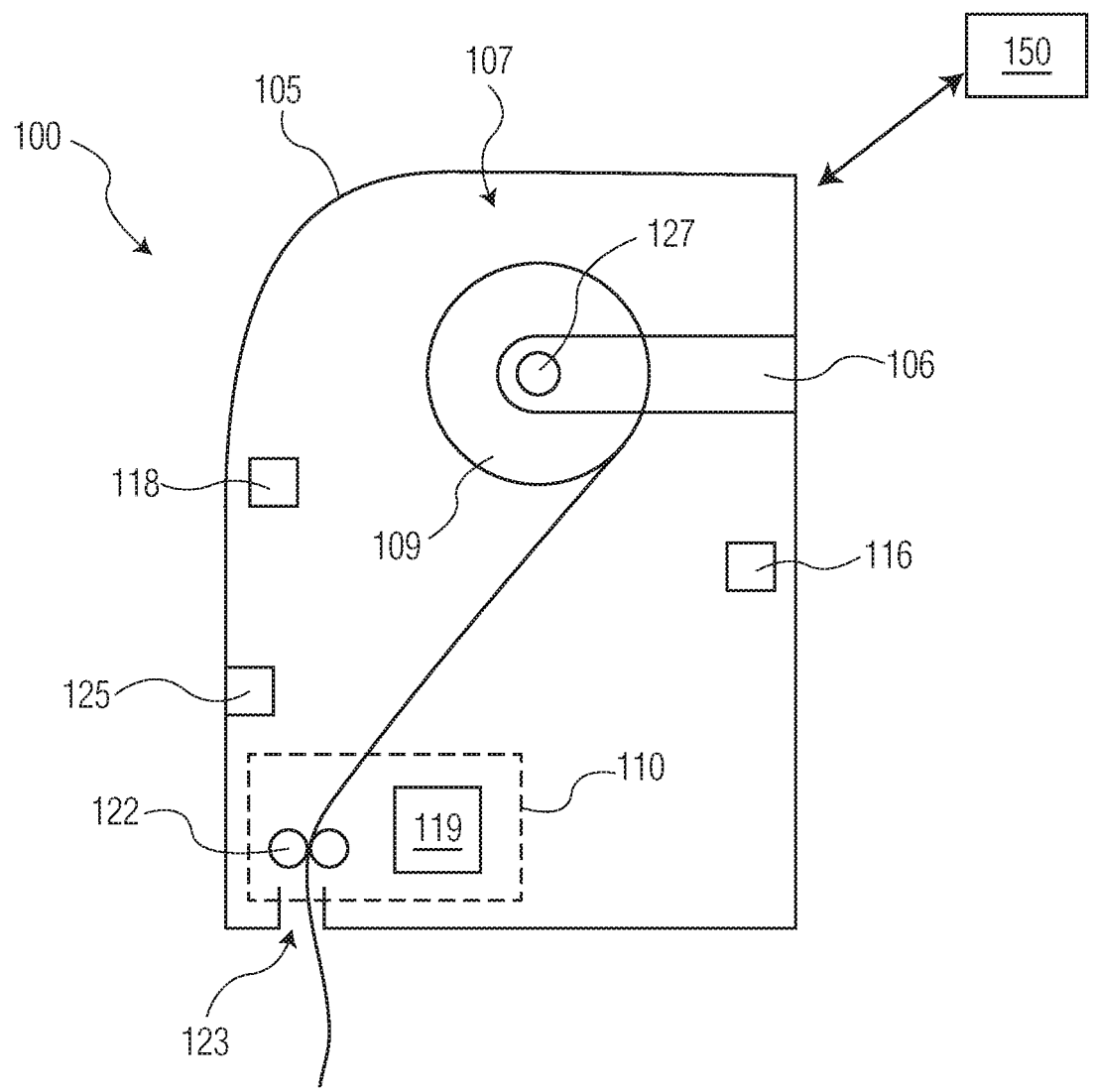
FIG. 2 is a cutaway representation of an example dispenser.
Figure 3:
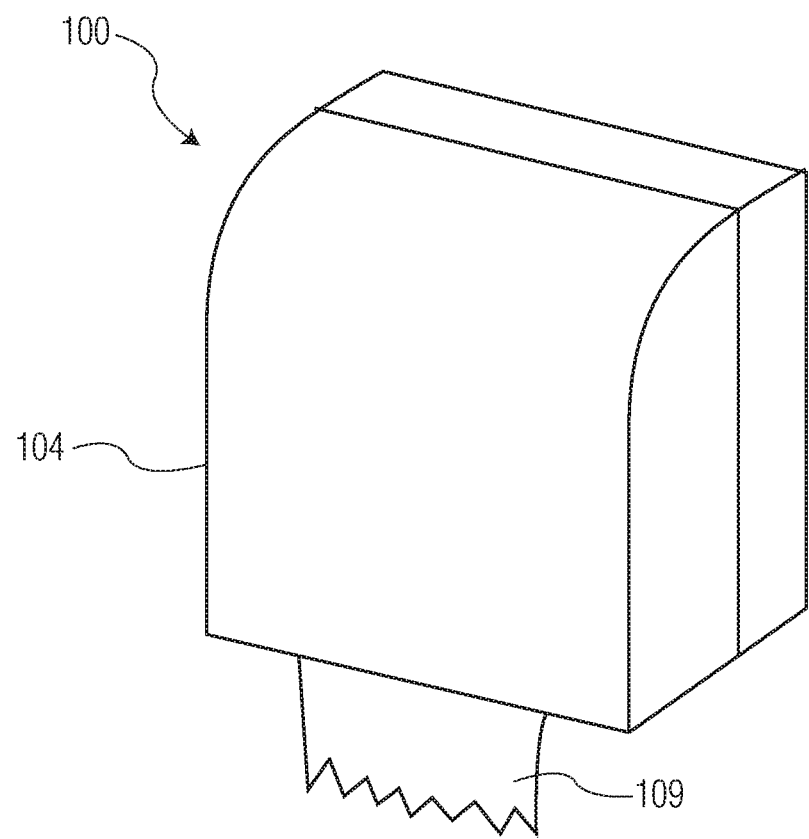
FIG. 3 is a perspective representation of the example dispenser.

An example dispenser is described in more detail below with reference to FIG. 2, which is a cutaway representation of an example dispenser 104, and FIG. 3, which is a perspective representation of the example dispenser 104.

The dispenser 104 includes a body 105 or outer cover or case 105, e.g., a composite, polymeric or metal housing. The outer cover 105 encloses, fully or partially, a product holding area 107 or interior 107 of the dispenser 104. The product holding area 107 holds, for example, the product-to-be-dispensed 109 (e.g., paper towels, bath tissue, wipes/wipers, liquid soap or sanitizer, lotion, deodorizer, etc.) by the dispenser 104 and, in some implementations, one or more electrical or mechanical components used to enable the dispense process such as a motor, batteries, rollers, sensors to determine when a user requests a dispense, etc. In some implementations, the dispenser 104 includes a processor 118 such as a microcontroller, ASIC or the like to store and execute programming to control the operation of the dispenser 104. The dispenser 104 can include a transceiver 116 to wirelessly communicate with other devices remote to the dispenser 104, e.g., such as other dispensers and/or the data processing system 102.

The dispenser 104 also includes a dispensing mechanism 110. The dispensing mechanism 110 operates to dispense consumable product stored in the holding area 107 (e.g., dispense a length of roll 109 for use to dry hands). In some implementations, for example, for rolled paper towels or wipers or bath tissue, the dispensing mechanism 110 is an electromechanical feed mechanism that includes or operates in conjunction with a motor 119 that, in response to a stimulus such as a user waving a hand proximate the dispenser 100, feeds a length of the roll 109 through an opening 123 in the body 105 to present to the user.

In some implementations, the dispenser 104 includes a proximity sensor 125 to sense when a user is close to the dispenser 104 and intends the dispenser 104 to dispense product. For some dispensers 104 this is often referred to as a hand-wave sensor, as the proximity sensor 125 is triggered (e.g., causes a dispense) in response to detecting a hand (or other object) moving in or out of it field of sensing/detection. In some implementations, the proximity sensor 125 is directed such that its field of sensing/detection projects out in front of the dispenser 104, down below the dispenser 104 or some combination thereof. The proximity sensor 125 can be, for example, an infrared detector, a motion detection, a time-of-flight sensor or the like. In some implementations the processor 118 is in communication with the sensor 125, e.g., through wired connections like a bus or through a wireless interface, such that when the sensor 125 detects movement in its field of sensing/detection, the sensor 125 reports the same to the processor 118. In turn, the processor 118, which is in communication with the dispensing mechanism 110, causes the dispensing mechanism 110 to actuate (e.g., the motor 119) thereby dispensing product/portion of the roll 109 to the user triggering the sensor 125.

The dispensing mechanism 110 can include a series of rollers 122 through which a portion of the roll 109 is feed such that when the dispensing mechanism 110 actuates it pulls and unwinds the roll 109 (or causes the roll 109 to be pulled and unwound) to feed a portion of the roll 109 to the user.

In some implementations, the motor 119 can be integral to the roll holder 106 and causes a spindle 127 of the roll holder 106 (e.g., on which the rolled product is mounted) to turn thereby causing the roll 109 to unwind and be dispensed. In the case, for example, of a liquid soap or sanitizer dispenser 104, the motor 119 may be a pump 119 that draws the liquid product from a bottle, cassette or other container holding the liquid product to use for a dispense operation. In the case of folded towels (or wipers/wipes or tissue), the dispenser mechanism 110 is the throat of the dispenser 104, through which product is dispensed and by which pressure (e.g., friction) is exerted on the towels as they are pulled through the throat to cause one towel to separate from another to enable single towel/sheet dispensing.

As described above, the dispensing system 100 includes a data processing system 102. The data processing system 102 can communicate with the dispensers 104 across wireless or wired channels, or some combination thereof. For example, in some implementations, the data processing system 102 includes a transceiver and microprocessor to facilitate such communications. The data processing system 102 is described in more detail below in reference to FIG. 2. In some implementations, as described above, the data processing system 102 communicates with the dispensers 104 (and, for example, other devices such as servers, gateways and/or mobile devices) through one or more wireless communication channels such as, for example, the BLUETOOTH protocol, mesh-based (e.g., ZIGBEE) protocols, through a WAN or LAN, and/or over cellular channels.

In some implementations, the data processing system 102 receives (or requests) from the dispensers 104 product usage information, battery status and/or other state/status information (e.g., fault conditions such as jams or low battery alerts). Product usage information describes, for example, the number of dispenses (and/or amount of consumable product dispensed) since the last consumable product refill or report from the dispenser 104 or over the life of the dispenser 104 or since the last battery change or charge of the dispenser 104, and/or the number of dispenses (and/or the amount of consumable product) remaining in the dispenser 104 before it is completed depleted of consumable product or before it reaches some consumable product level threshold (e.g., 10% product remaining). In some implementations, the battery status of a dispenser 104 represents battery energy available to the dispenser to complete dispenser tasks.

A dispenser task is a task performed by the dispenser 104 according to its programming (e.g., as coded in its firmware or software), design mechanics, design electronics or some combination thereof. Dispenser tasks include, for example, dispensing consumable product and reporting product usage information and battery status information. More generally, the battery status of a dispenser 104 describes, for example, the percentage of the battery's life remaining before the battery no longer has enough energy to power the dispenser 104 in its normal operation mode or before the battery is completely depleted/dead, or the percentage of the useful life of the battery is exceeded or reaches a predetermined threshold. For example, the battery status of the dispenser 104 can be reported as a voltage of the battery, given there can be a correlation between battery voltage drop and the life expectancy of a battery.

The data processing system 102 can receive and store this data (e.g., product usage information, battery status and/or other state/status information) for later access and use. The dispensers 104 can send the reports/information to the data processing system 102, for example, periodically (e.g., hourly or daily or after certain dispenser 104 events such as after each dispense, a set number of dispenses or a fault condition like a jam), upon the data processing system's 102 request and/or upon a low product condition (e.g., only 10% of the product remains). The reports can include time stamps indicating the date and time of each dispense, other state or condition (e.g., 25% battery remaining at 3 pm on Mar. 3, 20XX and/or the identity of the dispenser 104 (e.g., a unique identifier of the dispenser 104).

Figure 4:
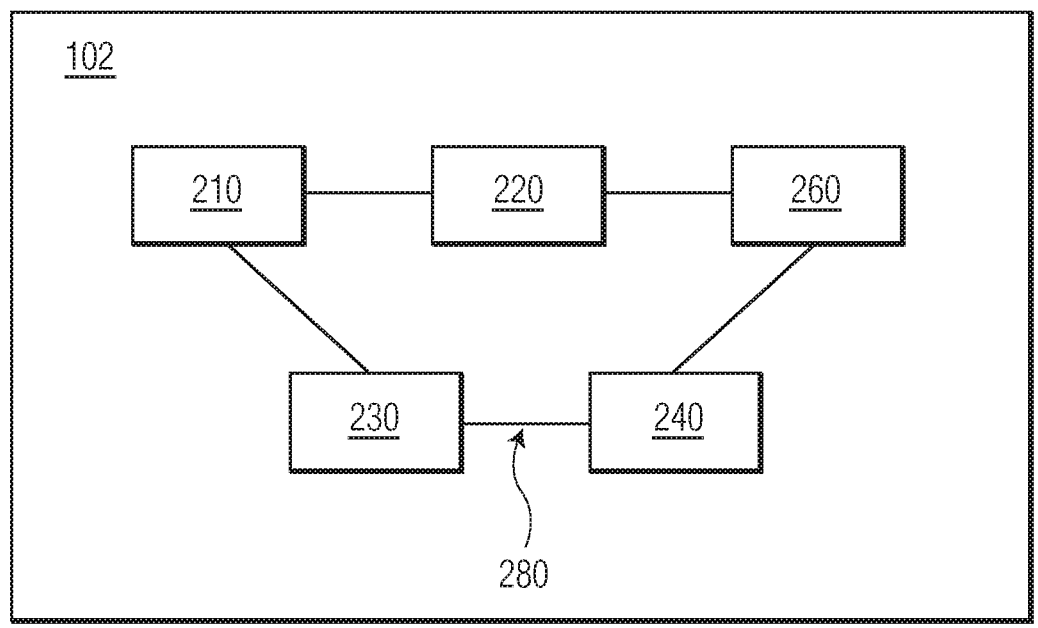
FIG. 4 is block diagram of an example data processing system.

FIG. 4 is block diagram of an example data processing system 102. The data processing system 102 can include one or more processor 210, a memory 220, a storage device 230, and an input/output device 240, and these devices may be collated or distributed across a location or more remotely across a network. Each of the components 210, 220, 230, and 240 can, for example, be interconnected using a system bus 280. The processor 210 is capable of processing instructions for execution within the data processing system 102. In one implementation, the processor 210 is a single-threaded processor. In another implementation, the processor 210 is a multi-threaded processor. The processor 210 is capable of processing instructions stored in the memory 220 or on the storage device 230.

The memory 220 stores information within the data processing system 102. In one implementation, the memory 220 is a computer-readable medium. In one implementation, the memory 220 is a volatile memory unit. In another implementation, the memory 220 is a non-volatile memory unit or a combination of volatile and non-volatile memory.

The storage device 230 is capable of providing mass storage for the data processing system 102. In one implementation, the storage device 230 is a computer-readable medium.

The input/output device 240 provides input/output operations for the data processing system 102. In one implementation, the input/output device 240 can include one or more of a network interface device(s), e.g., an Ethernet card, a serial communication device, e.g., and RS-232 port, a wireless interface device or a transceiver, e.g., an 802.11 card, BLUETOOTH interface, ZIGBEE interface. For example, the data processing system 102 can use the input/output device 240 to receive the product usage information and battery status transmitted by the transceiver 116 from one or more of the dispensers 104.

The data processing system 102 can also include a communication device(s) 260, e.g., display device, lights, microphone, speakers, to receive input data or information and/or send or communicate output data or information or indications to other input/output devices or users, e.g., service attendants.

The data processing system 102 (or in some implementations the dispensers 104) can determine expected product depletion dates for each of the dispensers 104 based on the respective product usage information for that dispenser 104. In some implementations, the dispenser 104 permits a service attendant, facility manager or the data processing system 102 to locally or remotely select how much product is dispensed by an actuation/dispense cycle. In this case, the report of the number of dispenses (e.g., product usage information) would include the number of dispenses at each length or amount. For example, if there are multiple dispensing lengths for a rolled hand towel dispenser 104 then the report would indicate that 300 dispenses of 8 inches occurred and 130 dispenses of 6 inches occurred or 430 dispenses or 8 inches occurred, and also indicate the current dispense length setting (e.g., 6 or 8 inches). With the programmatically set capacity/initial amount of each consumable (e.g., towels, tissue or soap) in the dispensers 104, the data processing system 102 can determine how much of the product has been used and how much remains. For example, if a hand towel roll has 4000 inches of product and there were 430 reported dispenses of 8 inches then the data processing system 102 determines that 70 ((4000−3440)/8) dispenses are available.

Continuing, if the number of dispenses is 430 and the maximum number of dispenses of the product until depletion is 500 (which can be administratively set in the data processing system 102) then the data processing system 102 determines that the remaining number of dispenses is 70 (i.e., 500−430). In some implementations, the dispensers 104 additionally or alternatively send the data processing system 102 reports specifying the amount of product used (e.g., 1004 feet of rolled towel, 17 ounces of hand soap) and/or the amount of product remaining.

More generally, the data processing system 102 can determine the expected product depletion date(s) of product in the dispensers 104 based on the product usage data, dispensing capacity, and/or historical dispensing trends.

In some implementations, the data processing system 102 stores the number of dispenses available for each dispenser 104 for each product (e.g., dispensing capacity) compatible with that dispenser to facilitate determining the expected product depletion date. Table 1 shows example dispensing capacities:

TABLE 1

|  | Product 1 | Product 2 | Product 3 |
|---|---|---|---|
| Dispensing Device A | 200 Dispenses | 570 Dispenses |  |
| Dispensing Device B | 200 Dispenses |  |  |
| Dispensing Device C |  |  | 250 Dispenses |

Table 1 shows that Product 1 (e.g., a small hand towel roll) is compatible with Dispensing Devices A and B and, for each, the dispensing capacity (e.g., the number of dispenses from full until the product is depleted) is 200 dispenses. Product 2 (e.g., a larger hand towel roll) is only compatible with Dispensing Device B and the dispensing capacity is 570 dispenses. Lastly, Product 3 (e.g., a liquid hand cleaner container) is only compatible with Dispensing Device C and the dispensing capacity is 250 dispenses.

The dispensing capacity, by way of example for a hand towel roll, can be determined based on the starting length of the hand towel roll and the length of roll dispensed during each dispensing process. For example, for a hand towel roll with a starting length of 475 feet and a dispense length of ten inches during each dispense, the number of dispenses to completely exhaust the roll is 570 ((475 feet*12 inches/per foot)/10 inches).

In some implementations, the data processing system 102 is programmed with an initial dispensing profile, for each dispenser 104, which defines, for example, the estimated time rate of use of product in the dispenser 104, the amount of product dispensed per dispense, and/or some combination thereof. Alternatively or additionally, the data processing system 102 can generate a usage profile for each dispenser 104 that specifies forecasted product usage over a future time period based on historical use using, for example, predictive modeling techniques such as neural networks, vector machines, k-nearest neighbor, regression, least squares, or Naive Bayes algorithms, or the like. This usage profile can then be used as the initial dispensing profile.

The initial dispensing profile, for example, may specify a linear-type use or average use profile such as forty dispenses per day or eight dispensers per hour at a specified product dispense amount. Or the profile may specify a time-varying use profile, for example, as shown in Table 2 below:

TABLE 2

| Daily Period | Estimated number of dispenses for Dispenser XYZ | Dispense Amount |
|---|---|---|
| 12:01am-3am | 7 | 5 units (e.g., inches or oz.) |
| 3:01am-6am | 12 | 5 units |
| 6:01am-9am | 17 | 5 units |
| 9:01am-noon | 14 | 5 units |
| 12:01pm-3pm | 22 | 5 units |
| 3:01pm-6pm | 25 | 5 units |
| 6:01pm-9pm | 13 | 5 units |
| 9:01pm-12am | 8 | 5 units |

In some implementations, the dispensing profile can vary not only across a day (as shown in Table 2) but also across days of the week, weeks of the month, holidays, special events (e.g., a sporting event or musical concert), or some combination thereof. For example, Table 2 reflects a dispensing profile for Mondays at a first dispense amount of 5 units. The dispensing profile for Tuesdays may be different such as that shown on Table 3, including a reduced dispense amount as this dispenser 104 may be on a path to deplete before other dispensers on its service route and the amount is reduced to push back its expected product depletion date to match or better align with those of the other dispensers:

TABLE 3

| Tuesday | Estimated number of dispenses for Dispenser XYZ | Dispense Amount |
|---|---|---|
| 12:01am-3am | 4 | 4 units |
| 3:01am-6am | 15 | 4 units |
| 6:01am-9am | 30 | 3 units |
| 9:01am-noon | 6 | 3 units |
| 12:01pm-3pm | 17 | 3 units |
| 3:01pm-6pm | 22 | 4 units |
| 6:01pm-9pm | 9 | 3 units |
| 9:01pm-12am | 3 | 4 units |

In some implementations, as described above, the data processing system 102 determines an expected product depletion date. For example, using the initial dispensing profile specified in Table 2 and 570 available dispenses for the dispenser 104, the data processing system 102 determines:

118 dispenses will occur on Monday (starting at 12:01 am) leaving 452 dispenses available (570–118)

118 dispenses will occur on Tuesday leaving 334 dispenses available (452–118)

118 dispenses will occur on Wednesday leaving 216 dispenses available (334–118)

118 dispenses will occur on Thursday leaving 98 dispenses available (216–118)

98 dispenses will occur on Friday and the dispenser will run out/be fully depleted during the 6:01 pm-9 pm time period (as only 1 dispense will remain during this period and 13 7 dispenses are expected).

Thus the data processing system 102 determines that the expected depletion date/time is Friday, 6:01 pm-9 pm. The data processing system 102 can communicate this information to a maintenance dashboard or otherwise alert maintenance personnel to this end.

In some implementations, the data processing system 102 dynamically adjusts the expected depletion date(s) over time as it receives reports from the dispenser(s) 104 concerning the number of dispenses that have actually occurred. For example, if at 11:59 pm on Monday, the data processing system 102 receives a report that 120 dispenses actually occurred, as opposed to the 118 expected, then the data processing system 102 would determine that only 450 dispenses are available starting on Tuesday and continue using the estimate profile such that the 332 (450–118) dispenses are expected to be available starting on Wednesday. If, however, at 11:59 pm on Tuesday, the data processing system 102 receives a report that 130 dispenses actually occurred, as opposed to the 118 expected, then the data processing system 102 would determine that only 320 dispenses are available starting on Wednesday, as opposed to the 332 expected. The sequence continues to iterate as updated dispense activity is reported to the data processing system 102.

The data processing system 102 (or the dispensers 104) also determines the expected battery depletion dates for the dispensers 104 (or a subgroup of dispensers 104) based on their respective battery status information.

In some implementations, the data processing system 102 stores the energy required for each dispenser 104 to perform a given dispenser task. Table 4 shows example dispenser tasks and respective energies:

TABLE 4

|  | Dispenser Task 1 | Dispenser Task 2 |
|---|---|---|
| Dispensing Device A | 0.01 Watt-hours | 0.03 Watt-hours |
| Dispensing Device B | 0.02 Watt-hours | 0.02 Watt-hours |

Table 4 shows that Dispenser Task 1 (e.g., transmitting a report of product usage data and battery status to the data processing system 102) requires 0.01 Watt-hours for Dispensing Device A and 0.02 Watt-hours for Dispensing Device B. And shows that Dispenser Task 2 (e.g., dispensing product) requires 0.03 Watt-hours for Dispensing Device A and 0.02 Watt-hours for Dispensing Device B. The energy required by a given dispenser 104 can vary for certain dispensing tasks. For example, concerning transmitting a report of product usage data, some dispensers 104 may be positioned such that there are obstacles to transmitting (e.g., stall doors, electrical interference from lights) that require more energy to reach the data processing system 102. Likewise, concerning performing a dispense process, the energy required to do so may be different between dispensers 104 or vary over time for a given dispenser 104. For example, the energy required to actuate a pump to dispense liquid soap or sanitizer product may be different than that required to dispense paper from a hard rolled towel and it may be easier to dispense paper from a hard rolled towel when it is close to depletion as compared to when full given the difference in rotational inertia required to rotate a full roll as compared to a mostly depleted roll.

In some implementations, the data processing system 102 is programmed with an initial battery capacity status, for each dispenser 104, which defines, for example, the estimated time rate of use of the battery in the dispenser 104. Alternatively or additionally, the data processing system 102 can generate a battery usage profile for each dispenser 104 that specifies forecasted battery usage over a future time period based on historical use based on, for example, predictive modeling techniques such as neural networks, vector machines, k-nearest neighbor, regression, least squares, or Naïve Bayes algorithms, or the like. This battery usage profile can then be used in determining the battery status.

The initial battery usage profile, for example, may specify a linear-type use or average use profile such as 0.8 Watt-hours are used per day. Or the profile may specify a time-varying use profile, for example, as shown in Table 5 below:

TABLE 5

| Daily Period | Estimated battery use for Dispenser XYZ (Watt-hours) |
|---|---|
| 12:01am-3am | 0.0 |
| 3:01am-6am | 0.05 |
| 6:01am-9am | 0.15 |
| 9:01am-noon | 0.15 |
| 12:01pm-3pm | 0.2 |
| 3:01pm-6pm | 0.1 |
| 6:01pm-9pm | 0.1 |
| 9:01pm-12am | 0.05 |

In some implementations, the battery usage profile can vary not only across a day (as shown in Table 5) but also across days of the week, weeks of the month, holidays, special events (e.g., a sporting event or musical concert), or some combination thereof.

In some implementations, as described above, the data processing system 102 determines an expected battery depletion date for each dispenser 104 (or a subgroup of dispensers 104). For example, using the initial usage profile specified in Table 5 and that an example dispenser 104 has 4 Watt-hours of initial battery capacity, the data processing system 102 determines:

The dispenser will use 0.8 Watt-hours of energy on Monday, leaving 3.2 Watt-hours available (4–0.8);

The dispenser will use 0.8 Watt-hours of energy on Tuesday, leaving 2.4 Watt-hours available (3.2–0.8);

The dispenser will use 0.8 Watt-hours of energy on Wednesday, leaving 1.6 Watt-hours available (2.4–0.8);

The dispenser will use 0.8 Watt-hours of energy on Thursday, leaving 0.8 Watt-hours available (1.6–0.8);

The dispenser will fully deplete its battery during the 9:01 pm-12 am slot on Friday.

Thus the data processing system 102 determines that the expected battery depletion date/time is Friday, 9:01 pm-12 am.

In some implementations, similar to revising the expected product depletion dates, the data processing system 102 dynamically adjusts the expected battery depletion date(s) over time as it receives reports from the dispenser(s) 104 concerning the actual battery status.

In some implementations, one of the dispensers 104 in a group of dispensers 104 will operate to be the designated dispenser 104 to collect the product usage data and battery status information from the other dispensers 104 in the group and send that data to the data processing system 102. Given that the transmission to the data processing system 102 usually requires more energy (as it's often remote the group of dispensers 104) than transmitting from one dispenser 104 in the group to another, having only one dispenser 104 send this transmission, instead of each the dispensers 104 in the group, is a way to conserve the batteries of the non-designated dispensers 104.

To this end the data processing system 102 can select which of the dispensers 104 is the designated/transmitting dispenser 104 (and/or receive data from the data processing system 102 to pass along to other dispensers 104 in the group). In this way, by managing battery usage through selecting (and changing) a particular dispenser 104 over time to be the designated/transmitting dispenser 104 (and, optionally, controlling product usage as described above) the data processing system 102 can cause the expected product depletion date and expected battery depletion date for a given dispenser 104 to be within a threshold range of one another (e.g., within the same 24 hour period, or within the same service window, etc.).

Further, through this same technique, i.e., purposefully selecting the designated/transmitting dispenser 104, the data processing system 102 can cause other dispensers 104 in the group to have the same or different expected product depletion dates and expected battery depletion date as any other dispenser 104 in the group. So, for example, in some scenarios, the data processing system 102 can cause all dispensers 104 in a washroom to have expected product depletion dates and expected battery depletion dates within the threshold range such that one service visit could change all the batteries and all the consumable product for all dispenses 104 in the washroom.

Alternatively, for example, the data processing system 102 can cause (or try to cause) only one (or less than all dispensers 104) in a washroom to have an expected product depletion date and an expected battery depletion date within the threshold range. For example, if all dispensers 104 in a washroom were caused to run out of product and batteries at similar times and the service attendant unexpectedly could not service the washroom then that washroom would have no functioning dispensers 104 to service any washroom users, which could lead to undesirable customer service effects.

Figure 5A:
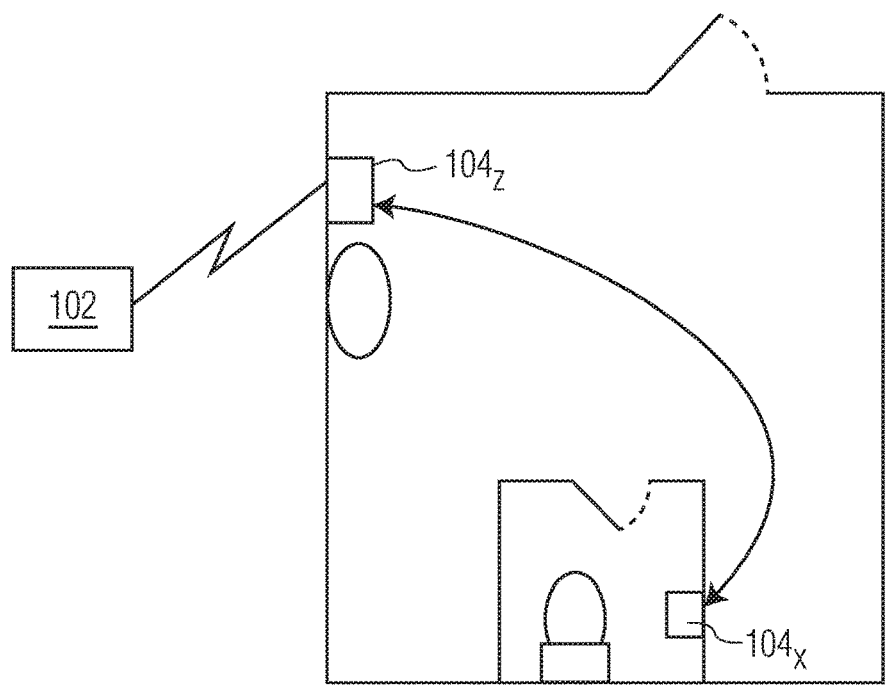
FIG. 5A is a block diagram of an example environment in which a first dispenser is a designated/transmitting dispenser.
Figure 5B:
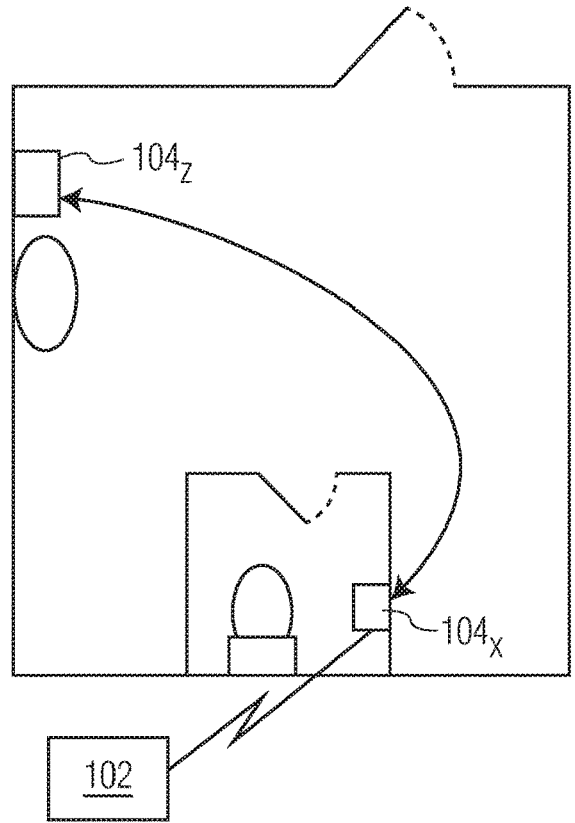
FIG. 5B is a block diagram of an example environment in which a second dispenser is a designated/transmitting dispenser.

FIG. 5A is a block diagram of an example environment in which a first dispenser is a designated/transmitting dispenser, and FIG. 5B is a block diagram of an example environment in which a second dispenser is a designated/transmitting dispenser.

FIG. 5A shows two dispensers 104x and 104z. In this scenario, dispenser 104x has an expected product depletion date two days away and an expected battery depletion date one day away with 0.6 Watt-hour of energy remaining, and dispenser 104z has an expected product depletion date two days away and an expected battery depletion date three days away with 2.1 Watt-hours of energy remaining. Further, based on early propagation studies, data has been programmed into the data processing system 102 to indicate that it takes 0.1 Watt-hours of energy to transmit between dispensers 104x and 104z and it takes, for each of dispensers 104x and 104z, 0.3 Watt-hours of energy to transmit to the data processing system 102, and there are four transmissions per day from the designated transmitting dispenser 104 to the data processing system 102 and between the dispensers 104.

Based on reports received conveying this information, the data processing system 102 selects dispenser 104z to be the designated/transmitting dispenser 104 to collect reporting data from dispenser 104x (e.g., product usage data and battery status) and, along with its own reporting data, transmit that information to the data processing system 102. Given that the transmission to the data processing system 102 requires more energy than transmitting between dispensers 104x and 104z, this can help conserve the battery of dispenser 104x in an effort to prolong its life another day to match that of dispenser 104x's expected product depletion date. Further, this will cause an additional demand on the battery of dispenser 104z which causes it's expected battery depletion date to drop to two days to match its expected product depletion date. Assuming the threshold range is one day then the data processing system 102, by giving dispenser 104z the additional dispenser task of being the designated/transmitting dispenser 104, has caused the expected product depletion dates and expected battery depletion dates for both dispensers to be within the threshold range, i.e., on the same day two days away. As shown in Table 6 below, the Transmission Number shows the number of transmissions over the next two days (one transmission every six hours which is four times a day or eight times over the next two days).

TABLE 6

| Transmission Number | Dispenser 104x Battery Remaining (Watt-hours) | Dispenser 104z Battery Remaining (Watt-hours) |
| --- | --- | --- |
| 1 | 0.6 | 2.1 |
| 2 | 0.5 | 1.8 |
| 3 | 0.4 | 1.5 |
| 4 | 0.3 | 1.2 |
| 5 | 0.2 | 0.9 |
| 6 | 0.1 | 0.6 |
| 7 | 0 | 0.3 |
| 8 | 0 | 0 |

As shown in Table 6, after the sixth transmission, dispenser 104x will run out of battery energy, so it's expected depletion date is two days away. Further, after the seventh transmission, dispenser 104z will run out of battery energy, so it's expected depletion date is also two days away.

On the other hand, FIG. 5B shows the same two dispensers 104x and 104z, but in this scenario, dispenser 104z has an expected product depletion date two days away and an expected battery depletion date one day away, and dispenser 104x has an expected product depletion date two days away and an expected battery depletion date three days away. Based on reports received conveying this information, the data processing system 102 selects dispenser 104x to be the designated/transmitting dispenser 104 to collect reporting data from dispenser 104z (and, along with its own reporting data) transmit that information to the data processing system 102. As described above that the transmission to the data processing system 102 requires more energy than transmitting between dispensers 104x and 104z, this can help conserve the battery of dispenser 104z to prolong its life another day to match that of dispenser 104z's expected product depletion date. This will also cause an additional demand on the battery of dispenser 104x which causes it's expected battery depletion date to drop to two days to match its expected product depletion date. Assuming the threshold range is one day then the data processing system 102, by giving dispenser 104x the additional dispenser task of being the designated/transmitting dispenser 104 has caused the expected product depletion dates and an expected battery depletion dates for both dispensers to be within the threshold range, with rationale similar to that as shown above with reference to Table 6.

This simple example can be extended to more than two dispensers 104 in a washroom, and even extended to multiple buildings, with multiple floors, each floor with multiple washrooms/breakrooms/kitchens with each having multiple dispensers, and so on. Further, while two variables have been described above with respect to the factors considered when determining which dispenser 104 to select as the designated/transmitting dispenser 104, many other factors can be considered including, for example, the quality of the connection between a given dispenser 104 and the data processing system 102, how easy is it to change the battery of a given dispenser 104 (e.g., dispenser 104 position in a washroom and battery location within a dispenser 104), etc.

As described above, many washrooms (or other areas having dispensers 104) have multiple dispensers 104. During installations of dispensers 104 in a given area it is often desirable to associate those dispensers into logical groups (e.g., all dispensers in a washroom or all dispensers in a floor). Often this is a manual process requiring installers to make those associations one by one, which can be time consuming and error-prone, especially for installations with hundreds of dispensers 104. The data processing system 102 can facilitate such a process in an automated or semi-automated manner. For example, the data processing system 102 can use received signal strength indicators (RSSI) between the dispensers 104 as a proxy for relative location and/or distance between dispensers 104 to group dispensers 104. Such a process is described in more detail with reference to FIG. 6, which is a block diagram of an example environment in which logical dispenser grouping can occur.

Figure 6:
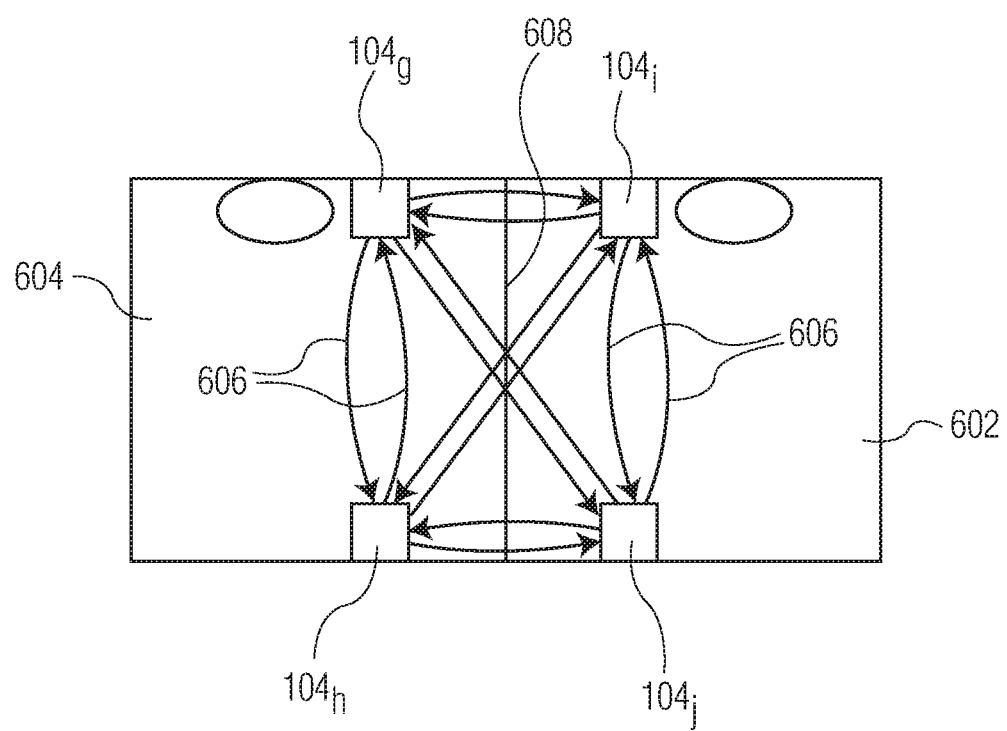
FIG. 6 is a block diagram of an example environment in which logical dispenser groupings can occur.

FIG. 6 shows two washrooms 602 and 604. Washroom 602 includes soap dispenser 104g and hand towel dispenser 104h, and washroom 602 includes soap dispenser 104i and hand towel dispenser 104j. Washrooms 602 and 604 are separated by a wall 608. In some implementations, after the dispensers 104 are installed in washrooms 602 and 604, the data processing system 102 can communicate with the dispensers 104 (or the dispensers 104 can self-initiate based on their programming) to cause the dispensers 104 to broadcast a packet of information 606 (e.g., at staggered or random time slots). If this packet is received by a given dispenser 104, the RSSI value for the broadcast will be observed or otherwise determined, and stored by the receiving dispenser 104 in association with the broadcasting/transmitting dispenser 104 (as the packet will include and identifier of the broadcasting/transmitting dispenser 104). In some scenarios, not all dispensers 104 can communicate with all other dispensers 104, as there may be obstructions or electromagnetic interference that prevent such communications. In other scenarios, all dispensers 104 can communicate with all other dispensers 104, as is the case in FIG. 6. For example, the broadcasts 606 sent by dispenser 104g are received by each of the other three dispensers 104h, i, j and dispenser 104g receives the broadcasts from each of the other three dispensers 104h, i, j.

In some implementations, the dispensers 104 transmit the RSSI information they received and/or determined, along with the associated dispenser identification information, to the data processing system 102. In turn, the data processing system 102 analyzes the RSSI information to make associations, for example as shown in Table 7 (showing RSSI values in dBs):

TABLE 7

| Dispenser | 104g | 104h | 104i | 104j |
| --- | --- | --- | --- | --- |
| 104g | | −40 dB | −60 dB | −68 dB |
| 104h | −40 dB | | −70 dB | −58 dB |
| 104i | −60 dB | −70 dB | | −37 dB |
| 104j | −68 dB | −58 dB | −37 dB | |

From Table 7, for example, the RSSI shows that the signal received at dispenser 104g from dispenser 104h has a signal strength of −40 dB, and that the signal received at dispenser 104g from dispenser 104j has a signal strength of −68 dB, lower than that from dispenser 104g as the signal was attenuated by the wall 608 and had a longer distance to travel.

Using preprogrammed thresholds or other machine learning algorithms (e.g., neural networks, etc.), the data processing system 102, for example, groups all dispensers 104 having a RSSI value greater than −50 dB together inferring the signal strength is strong enough to mean all such dispensers are in the same room (e.g., washroom 604). As such, the data processing system 102 groups dispensers 104h and 104g together (having a RSSI of −40 dB) and dispensers 104i and 104j together (having a RSSI of −37 dB).

In some implementations these groups can be verified based on dispenser usage patterns. For example, it could be expected that if soap dispenser 104g is actuated (indicating a patron is washing her hands) then the paper towel dispenser 104h will be actuated within a threshold time period thereafter (e.g., one or two minutes after the soap dispenser 104g is actuated) indicating that patron is drying her hands after washing them. If these sequences occur regularly, it confirms or reinforces that dispensers 104g and 104h are in the same washroom (i.e., washroom 604). The data processing system 102 can perform this confirmation process by analyzing the reporting data and determining if these types of sequences occur. If they do not occur then the data processing system 102 can alert a service attendant to visit the washroom or other facility to inspect the installation and confirm. In this way the data processing system 102 and dispensers 104 can facilitate an automated installation process.

EMBODIMENTS

Embodiment 1. A dispensing system comprising a plurality of dispensers, each configured to dispense one of soap, paper towels or air freshener and each is configured to report product usage information and battery status, wherein the battery status of a dispenser represents battery energy available to the dispenser to complete dispenser tasks; and a data processing system configured to receive the product usage information and battery status from each of the plurality of dispensers, determine expected product depletion dates for each of the plurality of dispensers based on the respective product usage information, and determine expected battery depletion dates for each of the plurality of dispensers based on the respective battery status, determine respective dispenser tasks for one or more of the plurality of dispensers that specify tasks a dispenser is responsible to perform over a given time period to cause, for each of one or more of the plurality of dispensers, the respective expected product depletion date and expected battery depletion date to be within a threshold range of one another, and communicate the respective dispenser tasks to the one or more of the plurality of dispensers.

Embodiment 2. The dispensing system of embodiment 1, the dispenser tasks include receiving product usage information and battery status from each of the plurality of dispensers and transmitting the product usage information and battery status from each of the plurality of dispensers to the data processing system.

Embodiment 3. The dispensing system of embodiment 2, wherein the dispenser tasks include receiving respective dispenser tasks, from the data processing system, for one or more of the plurality of dispensers, and transmitting the respective dispenser tasks to the respective one or more of the plurality of dispensers.

Embodiment 4. The dispensing system of any preceding embodiment, wherein the product usage information comprises a number of dispenses over a given time period.

Embodiment 5. The dispensing system of any preceding embodiment, wherein the one or more of the plurality of dispensers are configured to receive the respective the dispenser tasks and perform the respective dispenser tasks.

Embodiment 6. The dispensing system of any preceding embodiment, wherein the threshold range is on a same day.

Embodiment 7. The dispensing system any preceding embodiment, wherein the respective expected product depletion date and expected battery depletion date is on a same day as a scheduled service visit for the one or more of the plurality of dispensers.

Embodiment 8. The dispensing system of embodiment 7, wherein a time of the respective expected product depletion date and expected battery depletion date are after a time of the scheduled service visit.

Embodiment 9. The dispensing system of any preceding embodiment, wherein the respective expected product depletion date and expected battery depletion date are after a date of a scheduled service visit for the one or more of the plurality of dispensers.

Embodiment 10. A method comprising receiving product usage information and battery status from each of a plurality of dispensers, determining expected product depletion dates for each of the plurality of dispensers based on the respective product usage information; determining expected battery depletion dates for each of the plurality of dispensers based on the respective battery status; determining respective dispenser tasks for one or more of the plurality of dispensers that specify tasks a dispenser is responsible to perform over a given time period to cause, for each of one or more of the plurality of dispensers, the respective expected product depletion date and expected battery depletion date to be within a threshold range of one another, and communicating the respective dispenser tasks to the one or more of the plurality of dispensers.

Embodiment 11. The method of embodiment 10, wherein the product usage information comprises a number of dispenses over a given time period.

Embodiment 12. The method of embodiments 10 or 11, wherein the one or more of the plurality of dispensers are configured to receive the respective the dispenser tasks and perform the respective dispenser tasks.

Embodiment 13. The method of any of embodiments 10-12, wherein the threshold range is on a same day.

Embodiment 14. The method of any of embodiments 10-13, wherein the respective expected product depletion date and expected battery depletion date is on a same day as a scheduled service visit for the one or more of the plurality of dispensers.

Embodiment 15. The method of any of embodiments 10-13, wherein a time of the respective expected product depletion date and expected battery depletion date are after a time of the scheduled service visit.

Embodiment 16. The method of any of embodiments 10-13, wherein the respective expected product depletion date and expected battery depletion date are after a date of a scheduled service visit for the one or more of the plurality of dispensers.

Embodiment 17. A method comprising communicating product usage information and battery status to a data processing system, wherein the data processing system determines an expected product depletion date based on the product usage information and determines an expected battery depletion date based on the battery status; and receiving, from the data processing system, dispenser tasks that specify tasks to perform over a given time period to cause the expected product depletion date and expected battery depletion date to be within a threshold range of one another.

Embodiment 18. The method of embodiment 17 comprising performing the dispenser tasks.

Embodiment 19. The method of any of embodiments 17-18, wherein the product usage information comprises a number of dispenses over a given time period.

Embodiment 20. The method of any of embodiments 17-19, wherein the expected product depletion date and expected battery depletion date is on a same day as a scheduled service visit.

Embodiment 21. A dispensing system comprising a plurality of dispensers, each configured to dispense one of soap, sanitizer paper towels or air freshener and each is configured to determine expected product depletion dates based on respective product usage information, and determine expected battery depletion dates based on respective battery status, wherein the battery status of a dispenser represents battery energy available to the dispenser to complete dispenser tasks; and a data processing system configured to receive expected product depletion dates and the expected battery depletion dates, determine a respective dispenser task for one or more of the plurality of dispensers that specify a task a dispenser is responsible to perform over a given time period to cause, for each of one or more of the plurality of dispensers, the respective expected product depletion date and expected battery depletion date to be within a threshold range of one another, and communicate the respective dispenser tasks to the one or more of the plurality of dispensers.

Implementations or aspects of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification may, in some implementations, be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The separation of various system components in the embodiments described above should not be understood as requiring such separation in all embodiments, and it should be understood that the described program components and systems can generally be integrated together in a single software product or packaged into multiple software products.

What is claimed is:

1. A dispensing system comprising:
a plurality of dispensers, each configured to dispense one of soap, sanitizer paper towels or air freshener and each is configured to report product usage information and battery status, wherein the battery status of a dispenser represents battery energy available to the dispenser to complete a dispenser task; and
a data processing system configured to:
receive the product usage information and battery status for each of the plurality of dispensers,
determine expected product depletion dates for each of the plurality of dispensers based on the respective product usage information, and
determine expected battery depletion dates for each of the plurality of dispensers based on the respective battery status, determine a respective dispenser task for one or more of the plurality of dispensers that specify a task a dispenser is responsible to perform over a given time period to cause, for each of one or more of the plurality of dispensers, the respective expected product depletion date and expected battery depletion date to be within a threshold range of one another, wherein the determination comprises identifying which of the one or more of the plurality of dispensers that is outside of the threshold range, and communicate the respective dispenser task to the one or more of the plurality of dispensers that are outside of the threshold range of the expected battery depletion date, wherein the respective dispenser task comprises collecting the product usage information and the battery status from each of the plurality of dispensers and transmitting the product usage information and the battery status thereby increasing usage of the battery energy of the one or more of the plurality of dispensers to which the respective dispenser task is communicated to bring the one or more plurality of dispensers within the threshold range of the expected battery depletion date.

2. The dispensing system of claim 1, wherein the dispenser task includes receiving product usage information and battery status from each of the plurality of dispensers and transmitting the product usage information and battery status from each of the plurality of dispensers to the data processing system.

3. The dispensing system of claim 2 wherein the dispenser task includes receiving a respective dispenser task, from the data processing system, for one or more of the plurality of dispensers, and transmitting the respective dispenser task to the respective one or more of the plurality of dispensers.

4. The dispensing system of claim 1, wherein the product usage information comprises a number of dispenses over a given time period.

5. The dispensing system of claim 1, wherein the one or more of the plurality of dispensers are configured to receive the respective the dispenser task and perform the respective dispenser task.

6. The dispensing system of claim 1, wherein the threshold range is on a same day.

7. The dispensing system of claim 1, wherein the respective expected product depletion date and expected battery depletion date is on a same day as a scheduled service visit for the one or more of the plurality of dispensers.

8. The dispensing system of claim 7, wherein a time of the respective expected product depletion date and expected battery depletion date are after a time of the scheduled service visit.

9. The dispensing system of claim 1, wherein the respective expected product depletion date and expected battery depletion date are after a date of a scheduled service visit for the one or more of the plurality of dispensers.

10. A method comprising:
receiving product usage information and battery status for each of a plurality of dispensers;
determining expected product depletion dates for each of the plurality of dispensers based on the respective product usage information;
determining expected battery depletion dates for each of the plurality of dispensers based on the respective battery status;
determining respective dispenser tasks for one or more of the plurality of dispensers that specify tasks a dispenser is responsible to perform over a given time period to cause, for each of one or more of the plurality of dispensers, the respective expected product depletion date and expected battery depletion date to be within a threshold range of one another, wherein the determination comprises identifying which of the one or more of the plurality of dispensers that is outside of the threshold range, and
communicating the respective dispenser tasks to the one or more of the plurality of dispensers that are outside of the threshold range of the expected battery depletion date, wherein the respective dispenser task comprises collecting the product usage information and the battery status from each of the plurality of dispensers and transmitting the product usage information and the battery status thereby increasing usage of battery energy of the one or more of the plurality of dispensers to which the respective dispenser tasks is communicated to thereby bring the one or more plurality of dispensers within the threshold range of the expected battery depletion date.

11. The method of claim 10, wherein the product usage information comprises a number of dispenses over a given time period.

12. The method of claim 10, wherein the one or more of the plurality of dispensers are configured to receive the respective the dispenser tasks and perform the respective dispenser tasks.

13. The method of claim 10, wherein the threshold range is on a same day.

14. The method of claim 10, wherein the respective expected product depletion date and expected battery depletion date is on a same day as a scheduled service visit for the one or more of the plurality of dispensers.

15. The method of claim 14, wherein a time of the respective expected product depletion date and expected battery depletion date are after a time of the scheduled service visit.

16. The method of claim 10, wherein the respective expected product depletion date and expected battery depletion date are after a date of a scheduled service visit for the one or more of the plurality of dispensers.

* * * * *